Patented Apr. 2, 1940

2,195,787

UNITED STATES PATENT OFFICE 2,195,787

COMPLEX METAL COMPOUNDS OF AZO DYESTUFFS

Max Schmid, Riehen, Switzerland, assignor to the firm Society of Chemical Industry in Basle, Basel, Switzerland No Drawing. Original application November 2, 1936, Serial No. 108,902. Divided and this application February 4, 1938, Serial No. 188,804. In Switzerland November 6, 1935

12 Claims. (Cl. 260—147)

This application is a division of my application Serial No. 108,902, filed in the United States on November 2, 1936, and in Switzerland on November 6, 1935.

This invention relates to new dyestuffs obtained from new intermediate products which are obtained themselves by converting by known methods into the corresponding hydrazine a compound of the general formula

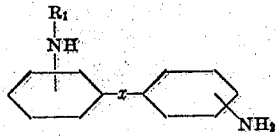

in which $x$ is a diphenyl linking or a bridge such as —O—, —S—, —CH=CH—, —CH$_2$—CH$_2$—, —CH$_2$—, —NH—,

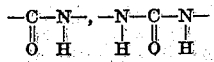

or a heterocyclic ring such as

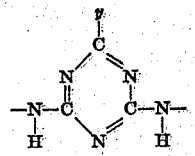

$y$=hydrogen or any substituent and the like, and R$_1$ is the residue of an organic acid, and condensing in known manner, after saponifying the radical of the organic acid, if this is present, with a suitable keto-compound to produce a pyrazolone capable of being coupled.

The new compounds, which correspond with the general formula

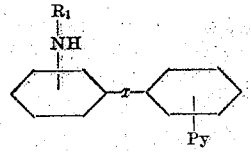

in which $x$ has the meaning ascribed to it above, R$_1$ stands for hydrogen or a radical of an organic acid and Py represents the pyrazolone radical, can be converted into new azo dyestuffs either by coupling them with diazo-compounds or by saponifying any radical of an organic acid that may be present, then diazotizing and coupling with coupling components or by using both reactions together.

The new azo dyestuffs are characterized by the presence of the atom grouping

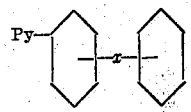

in which Py and $x$ have the meaning ascribed to them above and in which at least one azo-group is attached either to the pyrazolone radical or to the benzene nucleus which is not directly bound to the pyrazolone nucleus. They are particularly suitable for dyeing textiles consisting of or containing native or regenerated cellulose. The fastness of the dyeing may in many cases be improved by after-treatment with agents yielding metals, whereby metal complexes are formed on the fiber. Such metal complexes may be produced also in the dye-bath, in substance, or during the formation of dyestuff.

As parent substances for compounds of the general formula

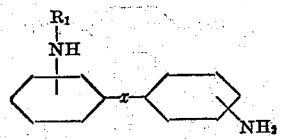

there may be mentioned benzidine, diphenyline of the formua

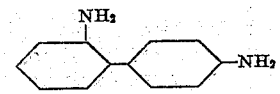

tolidine, dianisidine, diphenetidine, thioaniline, 4:4'-diaminodiphenyl ether, 4:4'-diaminostilbene, 4:4'-diaminodibenzyls, 4:4'- or 3:3'-diaminodiphenylmethane, 4:4'-diaminodiphenylamines, 4:4'- or 4:3'- or 3:4'- or 3:3'-diaminobenzoylaniline, 4:4'-diaminodiphenyl urea, the condensation product from 2 or 3 mol metaphenylenediamine or para-phenylenediamine and 1 mol cyanuric chloride or the condensation product from 1 mol cyanuric chloride, 1 mol aniline and 2 mol para-phenylenediamine or meta-phenylenediamine or similarly constructed condensation products in which the cyanuric ring is replaced by similar six-membered hetero rings containing carbon and nitrogen, such as those of the pyrimidine, the quinazoline, the phthalazine, and the like, which corresponds to products in which the linkage x can be formulated for example as

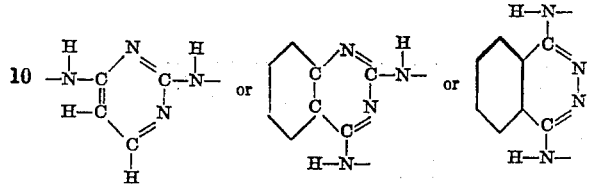

Compounds of the general formula

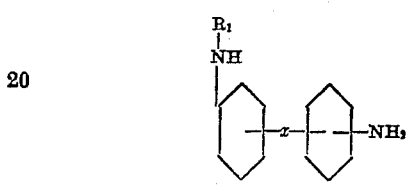

are therefore, for example, monoformylbenzidine, monoacetylbenzidine, monobenzoylbenzidine, 4- or 3-acetylamino-1-(4'- or 3'-amino)-benzoylaminobenzene, 4-amino-1-(4' or 3'-acetylamino)-benzoylaminobenzene-3-sulfonic acid, products obtained by monobenzoylation or monoacetylation from the reduced condensation products from 1 mol urea chloride or isocyanate from para- or meta-nitraniline and 1 mol 1:4-diaminobenzene-3-sulfonic acid, such as

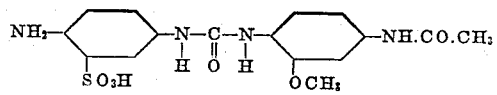

the ternary condensation products from 1 mol 1:4- or 1:3-diaminobenzene-3- or -4-sulfonic acid, 1 mol monoacetyl-para- or meta-phenylenediamine and 1 mol of a primary or secondary amine and 1 mol cyanuric chloride such as

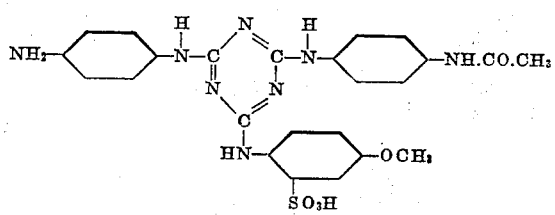

and the like.

As radicals of organic acids may be mentioned inter alia the radicals of formic acid, acetic acid, oxalic acid, benzoic acid, propionic acid or toluene sulfonic acid.

Among the suitable keto-compounds indicated above there may be named ethyl formylacetate, ethyl acetoacetate, ethyl oxalacetate, ethyl benzoylacetate or another ethyl aroylacetate, also ethyl aroyldiacetate, for instance ethyl terephthaloyldiacetate.

From the above disclosed starting materials there are derived the products which correspond with the aforesaid general formula

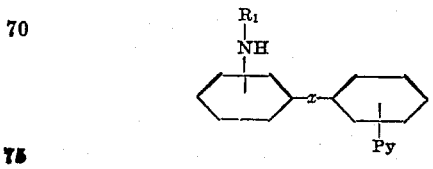

Such pyrazolones are, for example, the following:

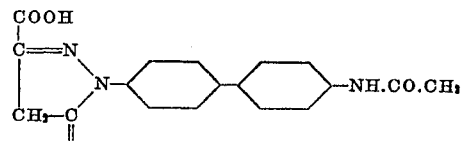

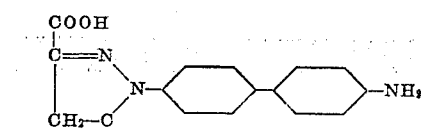

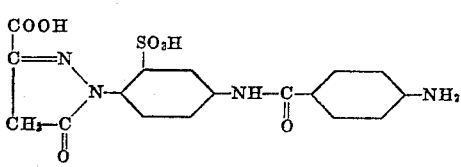

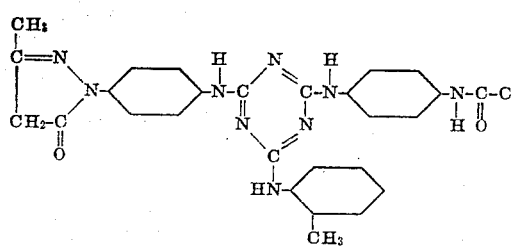

and so on, as indicated in the fifth paragraph of this specification.

Among the diazo-compounds which may be coupled with such products there must first be named the simple diazo-compounds, such as diazobenzene, diazonaphthalene, diazotoluene, diazoanisole, diazophenetole, diazotized aminoazobenzene or the like and sulfonic acids of them. Of particular interest are, however, the diazo-compounds which have in ortho- or peri-position to the diazo-group a hydroxyl group or a carboxyl group. Such diazo-compounds are, for example, those of ortho-aminophenols, ortho-aminonaphthols and their sulfonic acids, the diazo-compounds of 1:8-aminonaphthol sulfonic acids, also of ortho-aminocarboxylic acids, for instance anthranilic acid. With the aid of such compounds dyestuffs are obtained which can be converted into valuable metal compounds on the fiber or in substance by means of agents which yield metal, for instance copper salts, chromium salts or hydroxides of these metals.

Of these dyestuffs those are of especial value which are obtained by treating with copper on the fiber or in substance the azo dyestuffs which are themselves obtained by coupling the intermediate product of the general formula

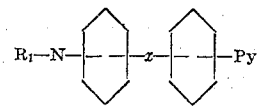

with a diazotized ortho-amino-carboxylic acid of the benzene series. These new dyestuffs are therefore the copper compounds of dyestuffs of the general formula

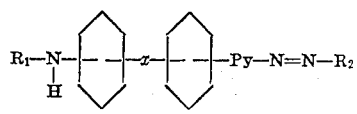

in which $R_2$ stands for an aromatic nucleus of the benzene series which carries a COOH— group in ortho-position to the —N=N— group; when $R_1$ is a radical of a polybasic acid, for instance dibasic acid, these dyestuffs may be formulated generally as follows:

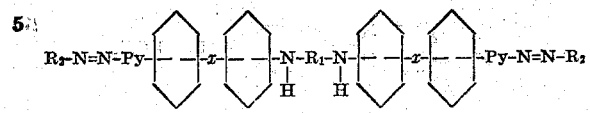

These new dyestuffs are yellow to brown-yellow powders soluble in water to a yellow solution and producing on cotton, whether dyed as such or produced on the fiber by subsequent treatment of the non-metallized azo dyestuff with an agent yielding copper, yellow tints which are characterized by their excellent fastness to light. They correspond to the copper compounds of the dyestuffs of the general formula

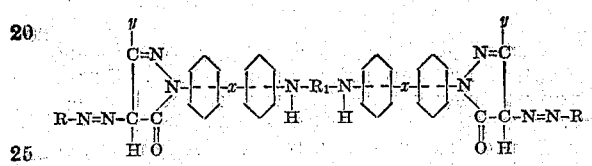

wherein R stands for an aromatic nucleus of the benzene series which is substituted in ortho-position to the —N=N— group by a COOH— group, $y$ stands for a member of the group consisting of H, methyl, phenyl, COOH and COO— alkyl, $x$ stands for a member of the group of linkages consisting of a diphenyl linkage, —O—, —S—, —CH=CH—, —CH$_2$—CH$_2$—, —CH$_2$—, —NH—,

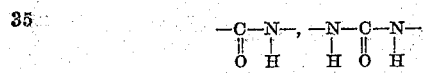

and a heterocyclic six-membered ring consisting of at least 3 and not exceeding 4 carbon atoms, and at least 2 and not exceeding 3 nitrogen atoms, not more than 2 nitrogen atoms standing adjacent to each other, which ring further contains at least twice and not more than three times the atom grouping

wherein the

group does not belong to the heterocyclic radical, and R$_1$ stands for the radical of a polyvalent organic acid.

The dyestuffs obtained by the invention may, as already stated, especially be used for dyeing vegetable fibers. They may also be used with a like result for dyeing regenerated cellulose, for instance, viscose or copper silk. Should the new duestuffs contain suitable substituents they may be diazotized on the fiber and developed by further coupling components or by treatment with a diazo-compound. When the dyestuffs have been made with the aid of ortho-aminophenols, ortho-aminocarboxylic acids or their esters or ethers, or when they contain the salicylic acid grouping or other lake-forming groups of atoms they are capable of conversion into metal compounds. Suitable metals coming into question besides the copper and chromium already mentioned are nickel, cobalt, iron, zinc or the like. The metal compounds may be obtained either on the fiber or in substance.

The new azo dyestuffs obtainable according to the present process correspond to the general formula

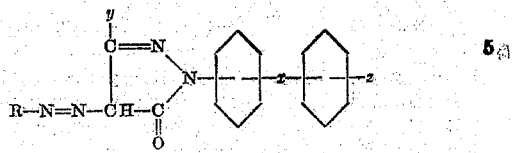

in which R stands for a nucleus selected from the group consisting of aromatic nuclei of the benzene and naphthalene series, $y$ stands for a member of the group consisting of H, methyl, phenyl, COOH and COO— alkyl, $x$ stands for a member of the group of linkages consisting of a diphenyl linkage, —O—, —S—, —CH=CH—, —CH$_2$—CH$_2$—, —CH$_2$—, —NH—, —CY$_2$—, —NH—,

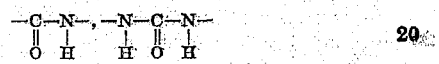

and a heterocyclic six-membered ring consisting of at least 3 and not exceeding 4 carbon atoms, and at least 2 and not exceeding 3 nitrogen atoms, not more than 2 nitrogen atoms standing adjacent to each other, which ring further contains at least twice and not more than three times the atom grouping

wherein the

group does not belong to the heterocyclic radical, and $z$ stands for a member of a group of substituents linked to the benzene nucleus by N-atoms and consisting of a member of the group consisting of —N=N—R$_1$, R$_1$ standing for an aromatic nucleus from the group consisting of aromatic nuclei of the benzene and naphthalene series, and

R$_2$ standing for the radical of an organic acid, which dyestuffs are yellow to brown and black powders dissolving in water to yellow to orange, to brown to blackish and to green solutions, and dyeing the fiber similar tints of good fastness.

The following examples illustrate the invention, the parts being by weight:

*Example 1*

22.6 parts of finely ground monoacetyl-benzidine are stirred in 50 parts of water and some ice with 30 parts of hydrochloric acid of specific gravity 1,15. Into this mixture there is dropped slowly at 0–10° C. a solution of 7 parts of sodium nitrite in about 20 parts of water and when the addition of this nitrite is complete the whole is stirred for about 1 hour and then filtered.

The filtered diazo-solution is run at 05° C. while stirring well into an externally cooled mixture of 100 parts of stannous chloride of about 63 per cent. strength and 50 parts of hydrochloric acid of specific gravity 1.15.

The hydrazine thus formed is sparingly soluble. After stirring for about 12 hours the mixture is filtered and the solid matter washed with dilute hydrochloric acid and then with water. By stirring this solid matter, if desired after separation of the tin, with dilute alkali the free hydrazine of the formula

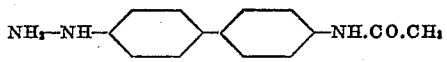

is obtained. From alcohol it crystallizes in the form of bright yellow needles of melting point 227° C. Alternatively the filtered diazo-solution is run whilst stirring into a mixture of 632 parts of bisulfite liquor of 40 per cent. strength, 30 parts of sodium carbonate and 50 parts of caustic soda solution of 36° Bé. Stirring is continued during the night and the product is salted out and filtered. The filter cake is stirred into 2000 parts of water and after addition of 60 parts of acetic acid the whole is heated to boiling. There are then added gradually about 60 parts of zinc dust and boiling is continued until the mass is decolorized. After filtering hot the hydrazine sulfonic acid of the formula

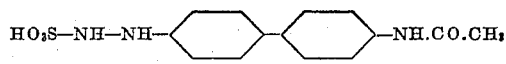

is salted out from the cool filtrate.

The hydrazine sulfonic acid can be converted into the hydrochloride of the hydrazine base by treatment with hydrochloric acid.

In like manner products can be prepared from the parent materials indicated in the 5th paragraph of this specification.

*Example 2*

The hydrazine hydrochloride of the formula

obtainable as described in paragraphs 1–3 of Example 1 is boiled together with 500 parts of water and 100 parts of hydrochloric acid of specific gravity of 1.15 for about 2–3 hours, whereby the hydrochloride is dissolved. If desired the solution may be treated with sulfurated hydrogen to remove tin, if necessary, filtered and cooled. The large part of the hydrochloride separates and a further quantity may be salted out from the mother liquor or the latter may be treated with alkali to recover the free base.

This base may be recrystallized from alcohol when it forms white crystals of melting point 179° C. which become brown on exposure to air and correspond with the formula

The corresponding product from mono-acetyl-ortho, ortho'-tolidine crystallizes from alcohol in which laminae of melting point 184° C. It has the formula

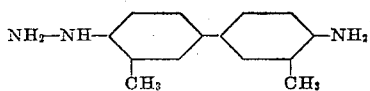

*Example 3*

24.1 parts of the hydrazine of Example 1 are dissolved in about 200 parts of alcohol mixed with some glacial acetic acid. There are then added 14 parts of ethylaceto-acetate and the mixture is boiled for about 1 hour. After cooling there are added to the mixture 20 parts of caustic soda solution of 36° Bé. and the mixture is stirred for 24 hours. By heating the larger part of the alcohol is expelled while water is substituted, the whole is filtered and pyrazolone precipitated by adding acid. It corresponds with the formula

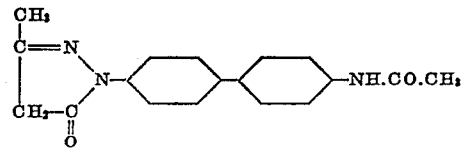

The condensation may also start from the hydrazine hydrochloride and be conducted in aqueous medium. In similar manner products are obtained from the other hydrazines indicated in Example 1. Instead of ethylaceto-acetate any other β-keto-carboxylic acid ester, for instance ethyl benzoyl acetate, terephthaloyl di-acetic ester, ethyl oxal-acetate or the sodium compounds thereof may be used.

*Example 4*

27.2 parts of the hydrazine hydrochloride of Example 2 are suspended in hot water. Condensation follows with 14 parts of ethylaceto-acetate at about 60° C. with gradual neutralization of the acid liberated in the condensation. When the condensation is complete the whole is cooled, made alkaline to phenolphthalein by means of caustic alkali, stirred for 12 hours, heated until everything has been dissolved and finally the pyrazolone precipitated by neutralization. It corresponds with the formula

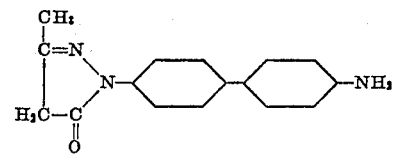

This new product is a white powder of melting point 194° C., soluble in dilute caustic soda solution and dilute mineral acid.

*Example 5*

30.7 parts of 1-phenyl-(4'-phenyl-4''-acetylamino)-3-methyl-5-pyrazolone of the formula

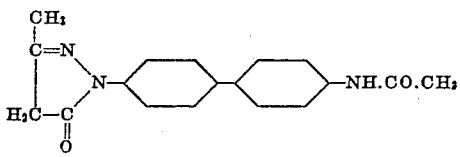

obtainable as described in Example 3 are dissolved in about 500 parts of water containing 10 parts of caustic soda solution of 36° Bé. and 15 parts of calcined sodium carbonate.

The filtered solution is mixed gradually with the diazo-compound from 17.5 parts of sulfanilic acid. When coupling is complete the whole is heated and the dyestuff salted out and isolated as usual. It is an orange-yellow powder and dyes cotton yellow tints. The dyestuff corresponds with the formula

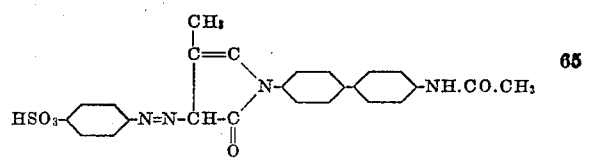

By substituting for the diazotized sulfanilic acid of this example another diazo-component further direct dyeing dyestuffs may be obtained. By using non-sulfonated diazo-compounds valuable pigments are formed while when an ortho-hydroxy- or -ortho-carboxy-diazo-compound is used dyestuffs which can be metallized are produced.

Thus, for example the dyestuff from diazotized sulfoanthranilic acid and 1-phenyl-(4'-phenyl-4''-acetylamino)-3 - methyl - 5-pyrazolone produces yellow tints on viscose artificial silk or natural silk which become fast to light when after-treated with copper. The copper compound of the dyestuff dyes itself cotton yellow tints.

Further products dyeing yellow to brown-red tints are obtained by replacement of the sulfoanthranilic acid by ortho-aminophenol-sulfonic acids of the benzene or naphthalene series, such as sulfo - amino-salicyclic acid, 4-chloro-2-aminophenol-6-sulfonic acid, 4-nitro-2-aminophenol-6-sulfonic acid, 1-amino - 2-hydroxynaphthalene - 4-sulfonic acid, 2-amino-1-hydroxynaphthalene-4:8-disulfonic acid, etc., and conversion of the new azo dyestuffs into their copper compounds.

Similar dyestuffs can be obtained by replacing the 1-phenyl - (4'-phenyl-4''-acetylamino - 3-methyl-5-pyrazolone by the corresponding 1-phenyl - (4'-phenyl-4''-acetylamino) - 5-pyrazolone-3-carboxylic acid. Further, the 4''-acetyl-amino group can be replaced by an amino group which is substituted by another organic acid radical. Such acid radicals may be radicals of mono-carboxylic acids, such as propionic acid, butyric acid, capric acid, benzoic acid, cinnamic acid, sulfobenzoic acid, and the like. The acetyl radical of the 4''-acetylamino-group can also be replaced by radicals of dicarboxylic acids, such as carbonic acid, oxalic acid, fumaric acid or maleic acid, phthalic acids and sulfo-phthalic acid, two or also only one carboxylic acid group being amidated. Finally, the 4''—$NH_2$— group may be substituted by such acid radicals which are not carboxylic acid radicals. As examples of these there may be cited the radicals of the para-toluene-sulfonic acids or the cyanuric acid. The introduction of such radicals into the dyestuffs of the general formula

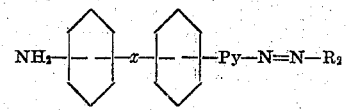

may also take place according to known methods.

Such dyestuffs are for example the dyestuffs or the copper complexes of the dyestuffs of the following formulas:

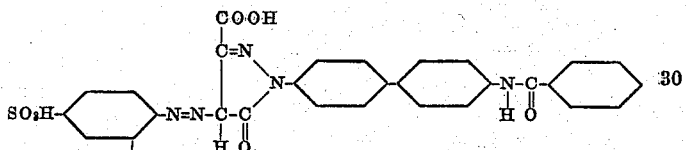

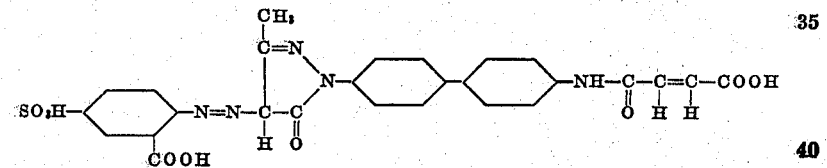

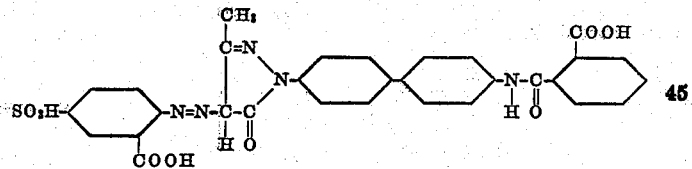

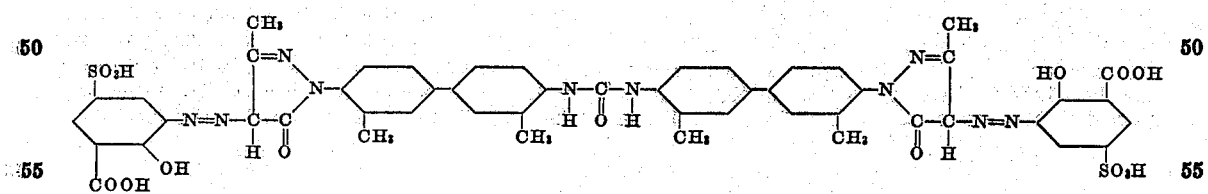

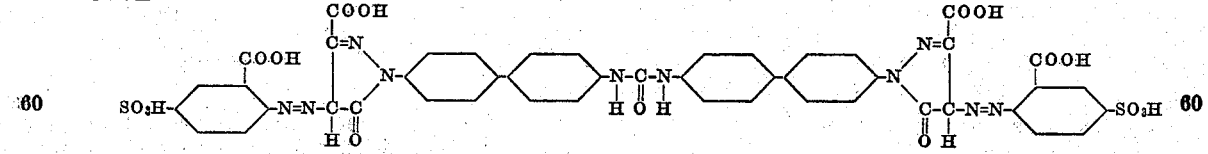

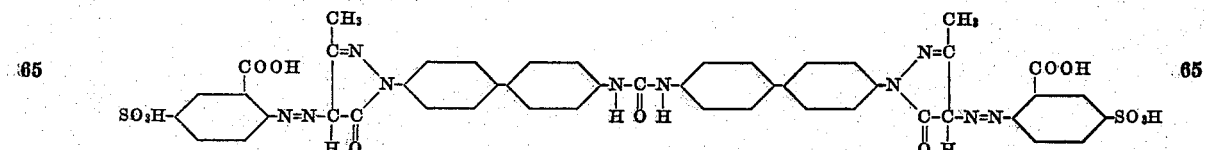

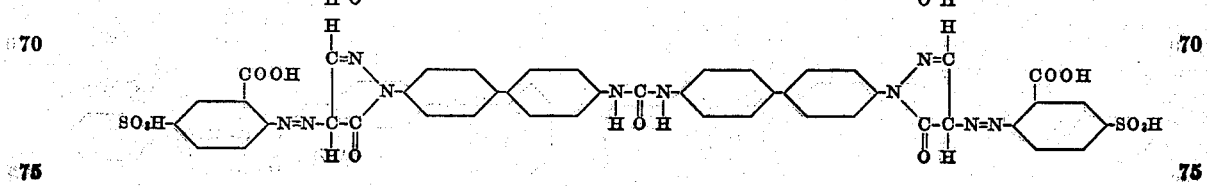

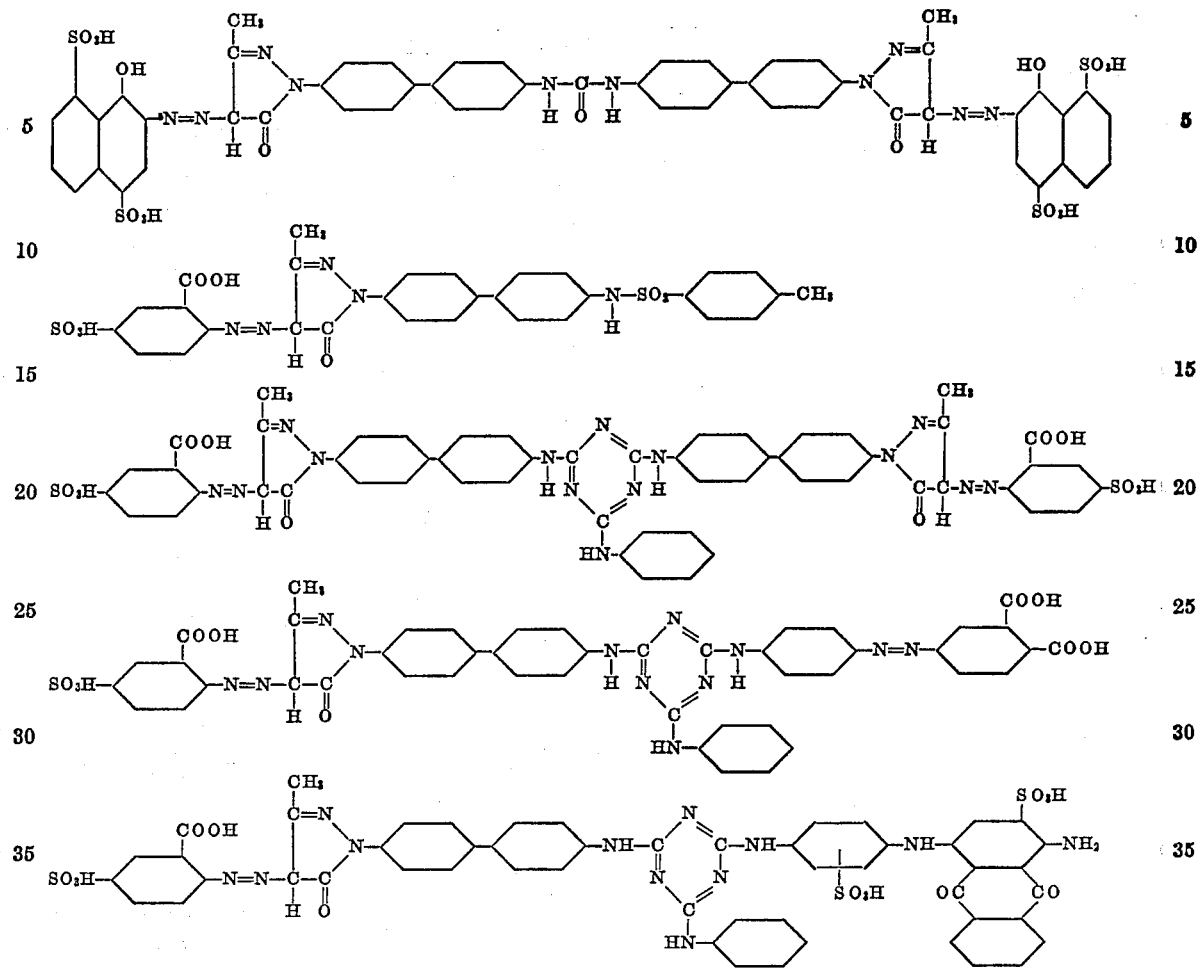

This latter dyestuff dyes cotton green tints.

In all these dyestuffs which correspond to the general formula

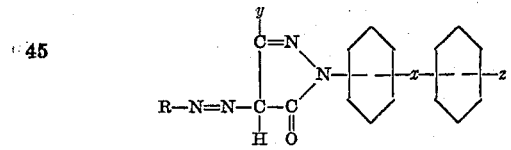

$x$ stands for a diphenyl linkage. Dyestuffs having similar properties are those in which $x$ is another linkage cited in the introduction. Compare also the last paragraph of Example 1 and the last paragraph of Example 3. Examples of such dyestuffs are:

These dyestuffs are above all valuable as metal compounds, and then particularly as copper compounds. If in these dyestuffs the diazotizing component $R_2$ (cf. 10th paragraph of this specification) is an ortho-aminocarboxylic acid of the benzene series, the tints obtained therewith on cotton, artificial silk or natural silk are usually yellow. The dyeings of the copper compounds which derive from ortho-amino-carboxylic acids of the naphthalene series or from ortho-oxydiazo-compounds of the benzene or naphthalene series are orange to brown-red. Thus, for example the dyestuff of the formula

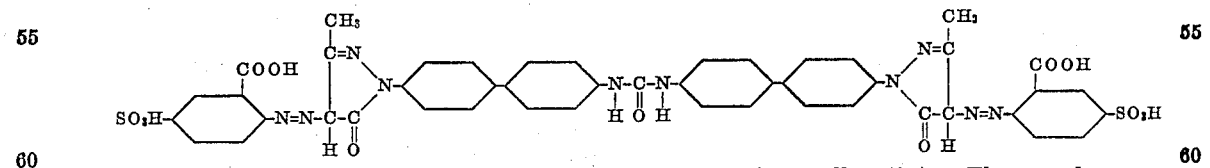

yields on cotton yellow tints. The complex copper, chromium, nickel and cobalt compounds of

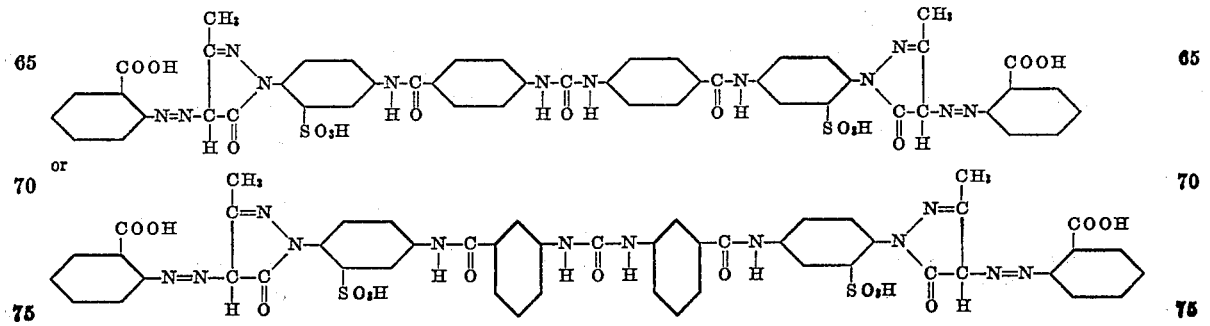

or this dyestuff yield also yellow tints on cotton. The iron compound yields brownish yellow tints.

The copper compound of the dyestuff of the formula

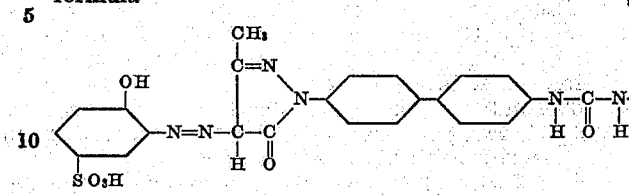

is an orange-brown powder dyeing the fiber orange-brown tints, and the dyestuff of the formula

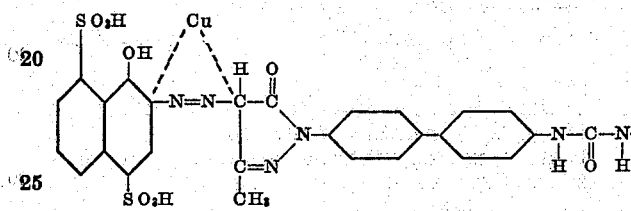

is a brown-black powder dyeing the fiber claret tints.

A further strong dyeing dyestuff can be produced as follows: 59.1 parts of the dyestuff from diazotized dehydrothiotoluidine sulfonic acid and 1-phenyl - (4'-phenyl - 4''-amino)-3-methyl-5-pyrazolone are treated in the usual manner with phosgene. When the reaction is complete the dyestuff formed is isolated.

It is a brown powder and dyes cellulose fibers fast orange tints.

What I claim is:

1. The complex metal compounds of the sulfunated azo dyestuffs containing at least one azo-group and corresponding to the general formula

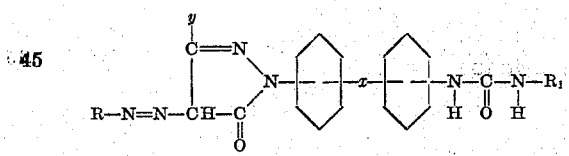

in which R stands for a nucleus selected from the group consisting of aromatic nuclei of the benzene and naphthalene series which is substituted in ortho-position to the —N=N— group by a substituent selected from the group consisting of OH and COOH, y stands for a member of the group consisting of H, methyl, phenyl, COOH and COO— alkyl, x stands for a member of the group of linkages consisting of a diphenyl linkage, —O—, —S—, —CH=CH—, —CH₂—CH₂—, —CH₂—, —NH—,

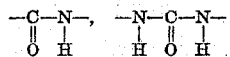

and a heterocyclic six-membered ring consisting of at least 3 and not exceeding 4 carbon atoms, and at least 2 and not exceeding 3 nitrogen atoms, not more than 2 nitrogen atoms standing adjacent to each other, which ring further contains at least twice and not more than three times the atom grouping

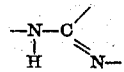

wherein the $$-N-$$
$$H$$

group does not belong to the heterocyclic radical

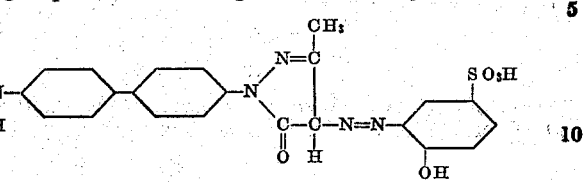

which is linked at least twice to phenyl groups by $$-N-$$
$$H$$

groups, R₁ stands for the radical of a mono-azo

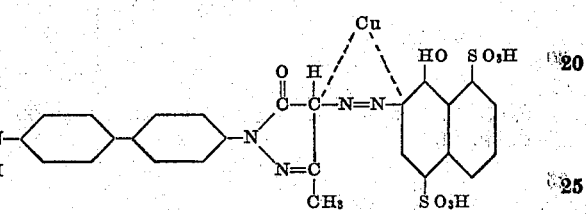

dyestuff, and in which general formula further the groups

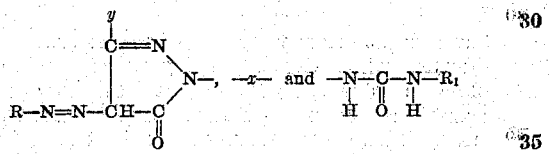

stand in another than in ortho-position to one another, which dyestuffs are yellow to brown and black powders dissolving in water to yellow to orange, to brown, to blackish and to green solutions, and dyeing the fiber similar tints of good fastness.

2. The complex copper compounds of the sulfonated azo dyestuffs containing at least one azo-group and corresponding to the general formula

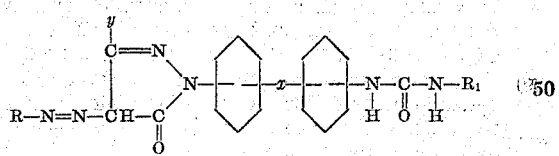

in which R stands for a nucleus selected from the group consisting of aromatic nuclei of the benzene and naphthalene series which is substituted in ortho-position to the —N=N— group by a substituent selected from the group consisting of OH and COOH, y stands for a member of the group consisting of H, methyl, phenyl, COOH and COO— alkyl, x stands for a member of the group of linkages consisting of a diphenyl linkage, —O—, —S—, —CH=CH—, —CH₂—CH₂—, —CH₂—, —NH—,

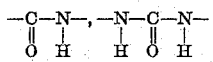

and a heterocyclic six-membered ring consisting of at least 3 and not exceeding 4 carbon atoms, and at least 2 and not exceeding 3 nitrogen atoms, not more than 2 nitrogen atoms standing adjacent to each other, which ring further contains at least twice and not more than three times the atom grouping $$-\text{N}-\text{C}\begin{smallmatrix}\diagup\\\diagdown\end{smallmatrix}\begin{smallmatrix}\\\text{N}-\end{smallmatrix}$$
$$\quad\ \ \text{H}$$

wherein the $$-\underset{\text{H}}{\text{N}}-$$

group does not belong to the heterocyclic radical which is linked at least twice to phenyl groups by $$-\underset{\text{H}}{\text{N}}-$$

groups, $R_1$ stands for the radical of a mono-azo $$\text{R}-\text{N}=\text{N}-\underset{\underset{\text{H}}{|}}{\text{C}}-\underset{\underset{\text{O}}{||}}{\text{C}}\diagdown\text{N}\diagup\overset{\overset{y}{|}}{\underset{}{\text{C}}}=\text{N}$$

dyestuff, and in which general formula further the groups $$\text{R}-\text{N}=\text{N}-\underset{\underset{}{}}{\text{CH}}-\underset{\underset{\text{O}}{||}}{\text{C}}\diagdown\text{N}\diagup\overset{\overset{y}{|}}{\underset{}{\text{C}}}=\text{N}, \quad -x- \quad \text{and} \quad \underset{\text{H}}{\text{N}}-\underset{\text{O}}{\overset{||}{\text{C}}}-\underset{\text{H}}{\text{N}}-\text{R}_1$$

stand in another than in ortho-position to one another, which dyestuffs are yellow to brown and black powders dissolving in water to yellow to orange, to brown, to blackish and to green solutions, and dyeing the fiber similar tints of good fastness.

3. The complex metal compounds of the sulfonated azo dyestuffs containing at least two azo-groups and corresponding to the general formula $$\text{R}-\text{N}=\text{N}-\underset{\underset{\text{H}}{|}}{\text{C}}-\underset{\underset{\text{O}}{||}}{\text{C}}\diagdown\text{N}-\text{[biphenyl]}-\underset{\text{H}}{\text{N}}-\underset{\text{O}}{\overset{||}{\text{C}}}-\underset{\text{H}}{\text{N}}-\text{R}_1$$

in which $y$ stands for a member of the group consisting of H, methyl, phenyl, COOH and COO— alkyl, R stands for a nucleus selected from the group consisting of aromatic nuclei of the benzene and naphthalene series which is substituted in ortho-position to the —N=N— group by a substituent selected from the group consisting of OH and COOH groups, and $R_1$ stands for the radical of a mono-azo dyestuff, which dyestuffs are soluble in water to yellow, orange and brown solutions and dyeing the fiber similar tints which can be after-treated with copper.

4. The complex copper compounds of the sulfonated azo dyestuffs containing at least two azo-groups and corresponding to the general formula $$\text{R}-\text{N}=\text{N}-\underset{\underset{\text{H}}{|}}{\text{C}}-\underset{\underset{\text{O}}{||}}{\text{C}}\diagdown\text{N}-\text{[biphenyl]}-\underset{\text{H}}{\text{N}}-\underset{\text{O}}{\overset{||}{\text{C}}}-\underset{\text{H}}{\text{N}}-\text{R}_1$$

in which $y$ stands for a member of the group consisting of H, methyl, phenyl, COOH and COO— alkyl, R stands for a nucleus selected from the group consisting of aromatic nuclei of the benzene and naphthalene series which is substituted in ortho-position to the —N=N— group by a substituent selected from the group consisting of OH and COOH groups, and $R_1$ stands for the radical of a mono-azo dyestuff, which dyestuffs are soluble in water to yellow, orange and brown solutions and dyeing the fiber similar tints which can be after-treated with copper.

5. The complex metal compounds of the sulfonated azo dyestuffs containing at least two azo-groups and corresponding to the general formula $$\text{R}-\text{N}=\text{N}-\underset{\underset{\text{H}}{|}}{\text{C}}-\underset{\underset{\text{O}}{||}}{\text{C}}\diagdown\text{N}-[\ ]-x-[\ ]-\underset{\text{H}}{\text{N}}-\underset{\text{O}}{\overset{||}{\text{C}}}-\underset{\text{H}}{\text{N}}-[\ ]-x-[\ ]-\text{N}\diagup\overset{\overset{y}{|}}{\underset{}{\text{C}}}=\text{N}\diagdown\underset{\underset{\text{O}}{||}}{\text{C}}-\underset{\underset{\text{H}}{|}}{\text{C}}-\text{N}=\text{N}-\text{R}_1$$

in which R and $R_1$ stand for nuclei selected from the group consisting of aromatic nuclei of the benzene and naphthalene series which are substituted in ortho-position to the —N=N— group by a substituent selected from the group consisting of OH and COOH, $y$ stands for a member of the group consisting of H, methyl, phenyl, COOH and COO— alkyl, $x$ stands for a member of the group of linkages consisting of a diphenyl linkage, —O—, —S—, —CH=CH—, —CH$_2$—CH$_2$—, —CH$_2$—, —NH—, $$-\underset{\underset{\text{O}}{||}}{\text{C}}-\underset{\text{H}}{\text{N}}-, \quad -\underset{\text{H}}{\text{N}}-\underset{\underset{\text{O}}{||}}{\text{C}}-\underset{\text{H}}{\text{N}}-$$

and a heterocyclic six-membered ring consisting of at least 3 and not exceeding 4 carbons atoms, and at least 2 and not exceeding 3 nitrogen atoms, not more than 2 nitrogen atoms standing adjacent to each other, which ring further contains at least twice and not more than three times the atom grouping $$-\text{N}-\text{C}\begin{smallmatrix}\diagup\\\diagdown\end{smallmatrix}\begin{smallmatrix}\\\text{N}-\end{smallmatrix}$$
$$\quad\ \ \text{H}$$

wherein the $$-\underset{\text{H}}{\text{N}}-$$

group does not belong to the heterocyclic radical which is linked at least twice to phenyl groups by $$-\underset{\text{H}}{\text{N}}-$$

groups, and in which general formula further the groups $$\text{R}-\text{N}=\text{N}-\underset{\underset{}{}}{\text{CH}}-\underset{\underset{\text{O}}{||}}{\text{C}}\diagdown\text{N}\diagup\overset{\overset{y}{|}}{\underset{}{\text{C}}}=\text{N}, \quad \text{N}-, \quad -x- \quad \text{and} \quad \underset{\text{H}}{\text{N}}-\underset{\text{O}}{\overset{||}{\text{C}}}-\underset{\text{H}}{\text{N}}-\text{R}_1$$

stand in another than in ortho-position to one another, which dyestuffs are yellow to brown and black powders dissolving in water to yellow to orange and to brown solutions, and dyeing the fiber similar tints of good fastness.

6. The complex copper compounds of the sulfonated azo dyestuffs containing at least two azo-groups and corresponding to the general formula $$\text{R}-\text{N}=\text{N}-\underset{\underset{\text{H}}{|}}{\text{C}}-\underset{\underset{\text{O}}{||}}{\text{C}}\diagdown\text{N}-[\ ]-x-[\ ]-\underset{\text{H}}{\text{N}}-\underset{\text{O}}{\overset{||}{\text{C}}}-\underset{\text{H}}{\text{N}}-[\ ]-x-[\ ]-\text{N}\diagup\overset{\overset{y}{|}}{\underset{}{\text{C}}}=\text{N}\diagdown\underset{\underset{\text{O}}{||}}{\text{C}}-\underset{\underset{\text{H}}{|}}{\text{C}}-\text{N}=\text{N}-\text{R}_1$$

in which R and R₁ stand for nuclei selected from the group consisting of aromatic nuclei of the benzene and naphthalene series which are substituted in ortho-position to the —N=N— group by a substituent selected from the group consisting of OH and COOH, y stands for a member of the

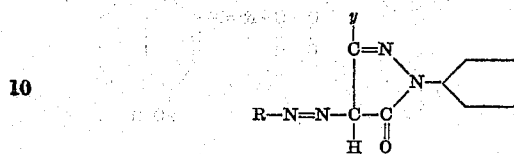

group consisting of H, methyl, phenyl, COOH and COO— alkyl, x stands for a member of the group of linkages consisting of a diphenyl linkage, —O—, —S—, —CH=CH—, —CH₂—CH₂—, —CH₂—, —NH—,

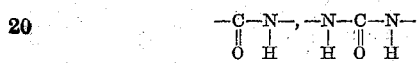

and a heterocyclic six-membered ring consisting of at least 3 and not exceeding 4 carbon atoms, and at least 2 and not exceeding 3 nitrogen atoms, not more than 2 nitrogen atoms standing adjacent to each other, which ring further contains at least twice and not more than three times the atom grouping

wherein the

group does not belong to the heterocyclic radical

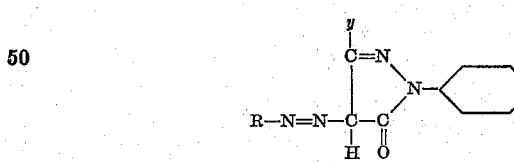

which is linked at least twice to phenyl groups by

groups, and in which general formula

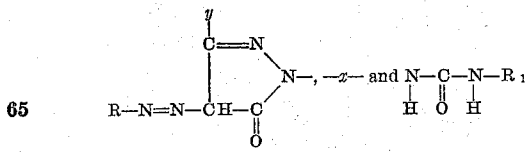

stand in another than in ortho-position to one another, which dyestuffs are yellow to brown and black powders dissolving in water to yellow to orange and to brown solutions, and dyeing the fiber similar tints of good fastness.

7. The complex metal compounds of the sulfonated azo dyestuffs of the general formula

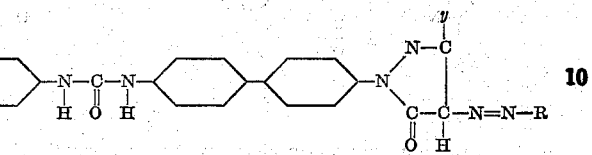

wherein R stands for an aromatic nucleus selected from the group consisting of nuclei of the benzene and naphthalene series which is substituted in ortho-position to the —N=N— group by a substituent selected from the group consisting of OH and COOH groups, and y stands for a member of the group consisting of H, methyl, phenyl, COOH and COO— alkyl, which dyestuffs are yellow to orange and brownish powders dissolving in water to similar solutions, and producing on cotton similar tints.

8. The complex copper compounds of the sulfonated azo dyestuffs of the general formula

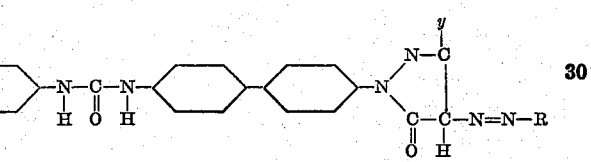

wherein R stands for an aromatic nucleus selected from the group consisting of nuclei of the benzene and naphthalene series which is substituted in ortho-position to the —N=N— group by a substituent selected from the group consisting of OH and COOH groups, and y stands for a member of the group consisting of H, methyl, phenyl, COOH and COO— alkyl, which dyestuffs are yellow to orange and brownish powders dissolving in water to similar solutions, and producing on cotton similar tints.

9. The copper compounds of the sulfonated azo dyestuffs of the general formula

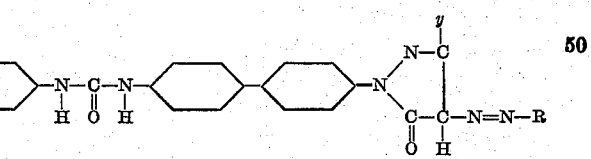

wherein R stands for an aromatic nucleus of the benzene series which is substituted in ortho-position to the —N=N— group by a COOH— group, and y stands for a member of the group consisting of H, methyl, phenyl, COOH and COO— alkyl, which dyestuffs are yellow to brown-yellow powders dissolving in water to yellow solutions, and producing on cotton yellow tints.

10. The copper compound of the dyestuff of the formula

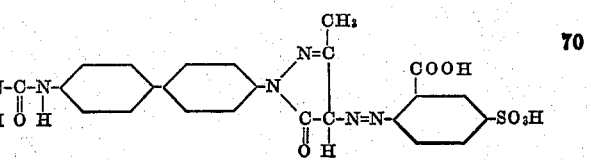

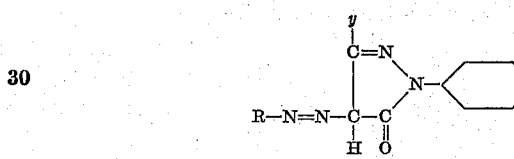

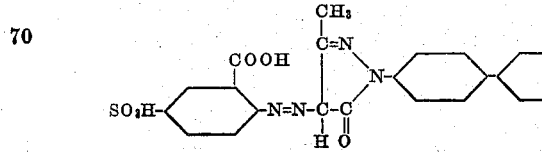

11. The copper compound of the dyestuff of the formula
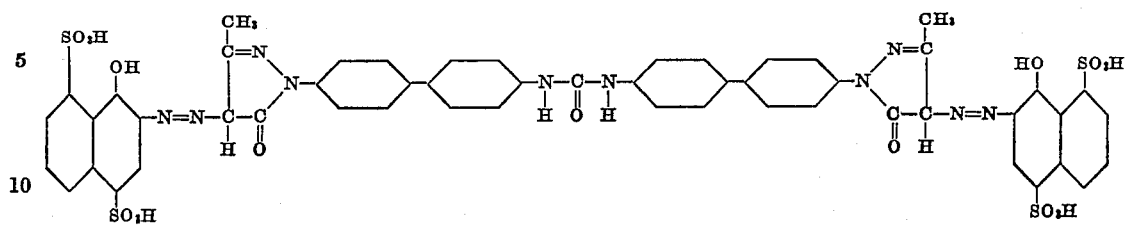
12. The copper compound of the dyestuff of the formula
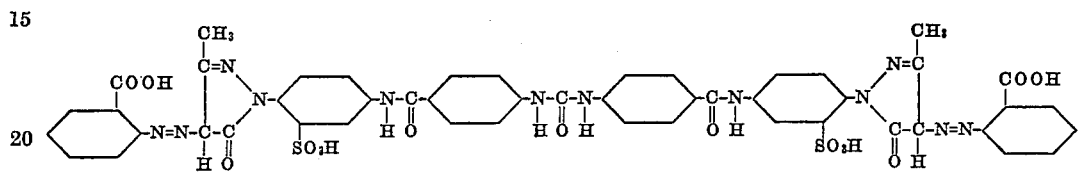
MAX SCHMID.